US012789491B2

(12) United States Patent
Hayata

(10) Patent No.: US 12,789,491 B2
(45) Date of Patent: Nov. 10, 2026

(54) METHOD FOR PRODUCING RETREADED TIRE

(71) Applicant: Asahi Kasei Kabushiki Kaisha, Tokyo (JP)

(72) Inventor: Daisuke Hayata, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 14 days.

(21) Appl. No.: 18/224,799

(22) Filed: Jul. 21, 2023

(65) Prior Publication Data

US 2025/0042200 A1 Feb. 6, 2025

(30) Foreign Application Priority Data

Jul. 22, 2022 (JP) ................................. 2022-117245

(51) Int. Cl.
*B29D 30/54* (2006.01)
*B60C 1/00* (2006.01)

(52) U.S. Cl.
CPC ............ *B29D 30/54* (2013.01); *B60C 1/0025* (2013.01); *B60C 2200/04* (2013.01); *B60C 2200/06* (2013.01)

(58) Field of Classification Search
CPC .............. B60C 1/0025; B60C 2200/04; B60C 2200/06; B60C 2200/065; B60C 13/00; B60C 2013/005; B29D 30/54; B29D 30/72
USPC ...................................................... 156/95, 96
See application file for complete search history.

(56) References Cited

U.S. PATENT DOCUMENTS 4,801,641 A * 1/1989 Ogawa .................... C08L 53/02 524/495
5,876,527 A * 3/1999 Tsuruta ............... B60C 15/0607 152/547
5,931,211 A * 8/1999 Tamura ................. B60C 9/2204 152/533
2009/0043039 A1* 2/2009 Sandstrom ................ C08L 7/00 524/511
2009/0048376 A1 2/2009 Nalesnik et al.
2009/0115108 A1 5/2009 Rodgers et al.
2015/0344679 A1* 12/2015 Balnis ...................... C08K 5/18 524/518
2016/0152805 A1* 6/2016 Jasiunas ................ C08L 19/003 523/156
2019/0375913 A1 12/2019 Gao et al.

FOREIGN PATENT DOCUMENTS

| | | | | |
|---|---|---|---|---|
| EP | 3492521 | A1 | | 6/2019 |
| EP | 4116108 | A1 | | 1/2023 |
| JP | S57-002344 | A | | 1/1982 |
| JP | 2004224952 | A | * | 8/2004 |
| JP | 2010-536952 | A | | 12/2010 |
| JP | 2013-071655 | A | | 4/2013 |
| JP | 2016-084405 | A | | 5/2016 |
| JP | 2021-527735 | A | | 10/2021 |
| KR | 1020160116753 | A | * | 10/2016 |
| WO | 2018/021538 | A1 | | 2/2018 |
| WO | 2021/246128 | A1 | | 12/2021 |
| WO | 2022/149471 | A1 | | 7/2022 |

OTHER PUBLICATIONS

Mazaki K, JP-2004224952-A, machine translation. (Year: 2004).*
Kim J, KR-1020160116753-A, machine translation. (Year: 2016).*

* cited by examiner

*Primary Examiner* — Sedef E Paquette
(74) *Attorney, Agent, or Firm* — Morgan, Lewis & Bockius LLP

(57) ABSTRACT

To provide a method for producing a retreaded tire, including retreading a base tire with a sidewall section including a rubber composition including a rubbery polymer having a specified structure, to thereby effectively inhibit the sidewall section from being degraded due to heating in adhesion by co-vulcanization and to increase the number of times of utilization of a retreaded tire.

A method for producing a retreaded tire, including retreading a base tire including a sidewall section containing 20 parts by mass or more of a rubbery polymer having a conjugated diene compound-based constituent unit and an ethylene-based constituent unit per 100 parts by mass of a rubber component.

9 Claims, No Drawings

METHOD FOR PRODUCING RETREADED TIRE

BACKGROUND OF THE INVENTION

Field of the Invention

The present invention relates to a method for producing a retreaded tire, and more specifically relates to a method for producing a retreaded tire by retreading a base tire with a sidewall section including a rubber composition including a rubbery polymer having a specified structure.

Description of the Related Art

Retreaded tires have been increasingly important not only from the viewpoint of economic efficiency, but also from the viewpoint of a reduction in environmental load in tire production. Retreaded tires are produced by again fixation, formation and/or the like of new treads onto base tires produced by scraping of tread surfaces of tires whose primary lives are terminated, to predetermined dimensions.

In a case where retreaded tires of pneumatic tires are produced, case portions of pneumatic tires usable for a long period and high in durability are essential in order to ensure stability, and rubber compositions used in sidewall sections forming such portions are demanded to have high durability.

Various methods are known as methods for enhancing durability of retreaded tires, and, for example, it is known that a cushion rubber composition for a retreaded tire, obtained by compounding 20 to 100 parts by mass of carbon black and 5 to 20 parts by mass of modified liquid rubber per 100 parts by mass of diene-based rubber, is used to thereby decrease a rubber component incorporated into a carbon black aggregate called occluded rubber and thus enhance durability of a retreaded tire (see Japanese Patent Laid-Open No. 2016-84405).

SUMMARY OF THE INVENTION

Not only an enhancement in durability by attention to a carbon black aggregate mass, but also an enhancement in durability by attention to a rubber material, as in Japanese Patent Laid-Open No. 2016-84405, has room for further improvement and study.

The present invention has been made in view of the above problems in the conventional art and the current circumstances, and an object of the present invention is to provide a method for producing a retreaded tire, including retreading a base tire with a sidewall section including a rubber composition including a rubbery polymer having a specified structure, to thereby effectively inhibit the sidewall section from being degraded due to heating in adhesion by co-vulcanization and to increase the number of times of utilization of a retreaded tire.

The present inventor has made intensive studies, and as a result, has found that degradation of a sidewall section progresses due to heating particularly in adhesion by co-vulcanization in production of a retreaded tire, thereby leading to limitation on the number of times of utilization of a retreaded tire, and has found that such a problem can be solved by use of a base tire with a sidewall section including a rubber composition including a rubbery polymer having a specified structure.

That is, the present invention is as follows.

<1>

A method for producing a retreaded tire, comprising retreading a base tire comprising a sidewall section containing 20 parts by mass or more of a rubbery polymer having a conjugated diene compound-based constituent unit and an ethylene-based constituent unit per 100 parts by mass of a rubber component.

<2>

The method for producing a retreaded tire according to <1>, wherein the rubbery polymer contains an aromatic vinyl compound-based constituent unit.

<3>

The method for producing a retreaded tire according to <1> or <2>, wherein the rubbery polymer is hydrogenated butadiene rubber or hydrogenated styrene-butadiene rubber.

<4>

The method for producing a retreaded tire according to <3>, wherein a percentage of hydrogenation of the rubbery polymer is 35 to 95 mol %.

<5>

The method for producing a retreaded tire according to any one of <1> to <4>, wherein the rubbery polymer has a functional group that interacts with silica and/or carbon black.

<6>

The method for producing a retreaded tire according to any one of <1> to <5>, wherein the sidewall section contains 30 parts by mass or more of silica per 100 parts by mass of the rubber component.

<7>

The method for producing a retreaded tire according to any one of <1> to <6>, wherein the sidewall section contains 20 parts by mass or more of natural rubber per 100 parts by mass of the rubber component.

<8>

The method for producing a retreaded tire according to any one of <1> to <7>, wherein the sidewall section contains 20 parts by mass or more of non-hydrogenated butadiene rubber per 100 parts by mass of the rubber component.

<9>

The method for producing a retreaded tire according to any one of <1> to <6>, wherein the sidewall section contains 30 parts by mass or more of the rubbery polymer, 30 parts by mass or more of natural rubber, and 30 parts by mass or more of non-hydrogenated butadiene rubber per 100 parts by mass of the rubber component.

<10>

The method for producing a retreaded tire according to any one of <1> to <9>, wherein an aspect ratio of the retreaded tire is 45 or more.

<11>

The method for producing a retreaded tire according to any one of <1> to <10>, wherein the retreaded tire is a truck/bus tire.

<12>

The method for producing a retreaded tire according to any one of <1> to <10>, wherein the retreaded tire is a passenger car tire.

According to the present invention, there can be provided a method for producing a retreaded tire, including retreading a base tire with a sidewall section including a rubber composition including a rubbery polymer having a specified structure, to thereby effectively inhibit the sidewall section from being degraded due to heating in adhesion by co-vulcanization and to increase the number of times of utilization of a retreaded tire.

DETAILED DESCRIPTION OF THE PREFERRED EMBODIMENTS

Hereinafter, an embodiment for carrying out the present invention (hereinafter, referred to as "the present embodiment") is described in detail.

Herein, the following present embodiment is illustrative for describing the present invention, and the present invention is not limited to the following embodiment. The present invention can be variously modified and carried out without departing from the gist thereof.

«Method for Producing Retreaded Tire»

A method for producing a retreaded tire of the present embodiment includes a step of retreading a base tire including a sidewall section containing 20 parts by mass or more of a rubbery polymer having a conjugated diene compound-based constituent unit and an ethylene-based constituent unit per 100 parts by mass of a rubber component (step of phase-forming a tread section on a base tire; hereinafter, sometimes referred to as "retreading step").

The method for producing a retreaded tire of the present embodiment can include, for example, a step of inspecting whether a used tire recovered can be retreaded (hereinafter, sometimes referred to as "inspection step"), a step of scraping off a tread section from the used tire and producing a base tire (hereinafter, sometimes referred to as "base tire production step"), and a step of re-forming a tread section on the base tire (retreading step of retreading the base tire). In the retreading step, a known method can be used, for example, a system (pre-cure system) in which a tread section is formed by fixation and formation of a tread pattern vulcanized in advance and adhesion by co-vulcanization in a vulcanization can with cushion rubber being interposed, or a system (re-molding system) in which unvulcanized tread rubber is mounted on the base tire and vulcanized in a mold. Each of the steps will be described below.

<Retreaded Tire>

A retreaded tire in the present embodiment can be obtained by retreading a base tire including a sidewall section containing 20 parts by mass or more of a rubbery polymer described below per 100 parts by mass of the rubber component. A retreaded tire produced by the present embodiment includes, for example, a tread section, a crown section, a sidewall section constituting a tire side surface, and a bead section abutting with a rim wheel. The retreaded tire in the present embodiment has, for example, a bead core and a carcass layer. An inner liner as a rubber layer corresponding to a tube and having high airtightness is provided inside the carcass layer in a radial direction of the tire. A base tire in the present embodiment is a tire obtained by removing a tread section from a used tire, and can be produced by, for example, the above base tire production step.

(Rubbery Polymer)

The base tire in the present embodiment includes a sidewall section containing 20 parts by mass or more of a rubbery polymer in the present embodiment per 100 parts by mass of the rubber component. The rubbery polymer in the present embodiment preferably has a conjugated diene compound-based constituent unit (hereinafter, also referred to as "conjugated diene moiety") and an ethylene-based constituent unit (hereinafter, also referred to as "ethylene moiety") and is a random copolymer. The rubbery polymer in the present embodiment may be produced by performing a hydrogenation reaction of a diene-based copolymer having a conjugated diene moiety to thereby partially form a double bond moiety in the conjugated diene moiety into an ethylene moiety, or may be produced by random copolymerization of a conjugated diene compound and ethylene.

The "random copolymer" herein refers to one in which the percentage of a long chain in an ethylene-based constituent unit (an ethylene-based constituent unit and an aromatic vinyl compound-based constituent unit in a case where an aromatic vinyl compound-based constituent unit described below is contained) is 10 mass % or less based on the total mass of the rubbery polymer. The percentage of the long chain here means the percentage of a chain (long chain) having eight or more of continuous certain structural units, in all such certain structural units. When the percentage of the long chain is 10 mass % or more, namely, the rubbery polymer is a random copolymer, fuel economy tends to be enhanced.

The rubbery polymer is preferably obtained by subjecting the diene-based copolymer to the hydrogenation reaction, from the viewpoint of production cost. Hereinafter, the rubbery polymer thus obtained is also referred to as "hydrogenated diene-based polymer". The hydrogenated diene-based polymer can be increased in percentage of hydrogenation to result in an increase in content of the ethylene moiety. The ethylene moiety in the hydrogenated diene-based polymer here encompasses any moiety obtained by hydrogenation of one (for example, 1,4 bond of a polymer of 1,3-butadiene as a monomer) which forms a polymer chain at each of both ends of a main chain of a conjugated diene compound monomer unit, and the ethylene moiety does not encompass any moiety obtained by hydrogenation of any other form (for example, 1,2-vinyl bond of a polymer of 1,3-butadiene as a monomer).

The conjugated diene compound is not particularly limited, and examples thereof include 1,3-butadiene, isoprene, 1,3-pentadiene, 2,3-dimethylbutadiene, 2-phenyl-1,3-butadiene, and 1,3-hexadiene. These may be used singly or in combinations of two or more kinds thereof. In particular, 1,3-butadiene and isoprene are preferable, and 1,3-butadiene is more preferable, from the practical viewpoint of, for example, availability of a monomer.

The rubbery polymer preferably contains an aromatic vinyl compound-based constituent unit, and is further preferably a random copolymer containing an aromatic vinyl compound-based constituent unit. As described above, in a case where the rubbery polymer contains an aromatic vinyl compound-based constituent unit (in particular, is a random copolymer), the respective percentages of the long chains of an ethylene-based constituent unit and an aromatic vinyl compound-based constituent unit are preferably 10 mass % or less based on the total mass of the rubbery polymer, from the viewpoint of fuel economy. In a case where the percentage of the long chain in the aromatic vinyl compound-based constituent unit is 10 mass % or less, the respective percentages of the long chains of a conjugated diene compound-based constituent unit and an ethylene-based constituent unit are relatively low, and thus whether the rubbery polymer is a random copolymer can be determined by the percentage of the long chain in the aromatic vinyl compound-based constituent unit.

The aromatic vinyl compound is not particularly limited, and examples thereof include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used singly or in combinations of two or more kinds thereof. In particular, styrene is particularly preferable from the practical viewpoint of, for example, availability of a monomer.

In a case where the percentage of the long chain in the aromatic vinyl compound-based constituent unit is 10 mass % or less, the respective percentages of the long chains of a conjugated diene compound-based constituent unit and an ethylene-based constituent unit are relatively low, and thus whether the rubbery polymer is a random copolymer can be determined by the percentage of the long chain in the aromatic vinyl compound-based constituent unit.

The percentage of the long chain in the aromatic vinyl compound-based constituent unit can be here calculated as the percentage of the value of integral of the following chemical shift S range (a) based on the total value of integral of the following chemical shift S ranges (a) to (c) in a 1H-NMR spectrum of the rubbery polymer, as measured with deuterochloroform as a solvent. For example, in a case where the aromatic vinyl compound is styrene, the percentage of such styrene can be calculated by determining the percentage of the value of integral of the range (a) based on the total value of integral of the respective ranges (a) to (c) and multiplying the percentage by 2.5. Thus, the percentage of the long chain in the aromatic vinyl compound-based constituent unit can be understood.

(a) long chain of 8 or more in aromatic vinyl compound: $6.00 \leq S < 6.68$ (b) long chain of 2 to 7 in aromatic vinyl compound: $6.68 \leq S < 6.89$ (c) short chain in aromatic vinyl compound: $6.89 \leq S \leq 8.00$ As described above, the rubbery polymer is preferably a hydrogenated diene-based random copolymer from the viewpoints of commercial production and low fuel economy, and, for example, the rubbery polymer is preferably, for example, hydrogenated butadiene rubber or hydrogenated styrene-butadiene rubber.

The rubbery polymer may be modified or unmodified, and is preferably a modified random copolymer from the viewpoints of brake performance and wear resistance. The modification method is described below, and examples of the rubbery polymer modified include a polymer having nitrogen of a compound having a functional group that interacts with silica and/or carbon black, in its structure. The modification can be typically performed by reacting a coupling agent or a reaction stopping agent having a functional group containing nitrogen, with a polymerization end terminal of the rubbery polymer. The rubbery polymer thus modified is preferable in that such a rubbery polymer, when kneaded with silica and/or carbon black as filler(s) and then formed into a rubber composition, forms interaction with such filler(s), and thus is enhanced in reinforcing properties, and/or suppressed in heat generation and enhanced in low fuel economy, due to reduced interaction made between such fillers.

In a case where the rubbery polymer is a hydrogenated diene-based copolymer, the percentage of hydrogenation thereof (percentage of hydrogenation of the conjugated diene moiety) is preferably 35 to 95 mol %, further preferably 50 mol % to 95 mol %, more preferably 60 mol % to 90 mol %, particularly preferably 70 mol % to 85 mol % from the viewpoint of crosslinking properties. The percentage of hydrogenation can be calculated from the spectrum decrease rate with respect to an unsaturated bond moiety, in a spectrum obtained by 1H-NMR measurement.

In a case where the rubbery polymer contains an aromatic vinyl compound-based constituent unit, in particular, in a case where the rubbery polymer is a random copolymer containing an aromatic vinyl compound-based constituent unit, the content of an aromatic moiety in the entire rubbery polymer is preferably 4 mass % or more, more preferably 6 mass % or more, further preferably 8 mass % or more based on the total amount of the rubbery polymer, from the viewpoint of fracture strength of a rubber composition to be formed. The content of the aromatic moiety is preferably 40 mass % or less, more preferably 30 mass % or less based on the total amount of the rubbery polymer, from the viewpoint of low fuel economy. The content of the aromatic moiety is measured according to a method described in Examples below.

The weight average molecular weight (Mw) of the rubbery polymer is preferably $10 \times 10^4$ or more, more preferably $20 \times 10^4$ or more, further preferably $30 \times 10^4$ or more from the viewpoint of compatibility with other rubber to be kneaded with the rubbery polymer. The weight average molecular weight of the rubbery polymer is preferably $200 \times 10^4$ or less, more preferably $100 \times 10^4$ or less, further preferably $70 \times 10^4$ or less from the viewpoint of processability.

The molecular weight distribution (Mw/Mn) of the rubbery polymer is preferably 1.1 or more, more preferably 1.2 or more, further preferably 1.3 or more from the viewpoint of processability. The molecular weight distribution of the rubbery polymer is preferably 4.0 or less, more preferably 3.0 or less, further preferably 2.0 or less from the viewpoint of low fuel economy. The weight average molecular weight (Mw) and the number average molecular weight (Mn) are each measured according to a method described in Examples below.

(Method for Producing Rubbery Polymer)

The method for producing the rubbery polymer is not particularly limited, and examples thereof include a method including a polymerization step of subjecting the conjugated diene compound and, if necessary, the aromatic vinyl compound to random copolymerization, and a hydrogenation step of subjecting the polymer obtained in the polymerization step to a hydrogenation reaction; or a method including a polymerization step of randomly copolymerizing the conjugated diene compound, ethylene, and, if necessary, the aromatic vinyl compound. In the method for producing the rubbery polymer, the hydrogenation step may be performed for forming an ethylene moiety, or ethylene may be copolymerized in the polymerization step. Even in the case of copolymerization of ethylene in the polymerization step, the hydrogenation step may be performed. For example, a usable known method can be a method described in Japanese Patent Laid-Open No. 2022-019552.

The method for producing the rubbery polymer may further include a modification step of modifying the polymer obtained in the polymerization step. In a case where the modification step is performed, it is preferable to add the conjugated diene compound at the end of the polymerization steps to thereby allow the polymerization terminal to be a conjugated diene compound-based constituent unit. Thus, a reaction by a modifying agent more suitably progresses.

(Modification Step)

The modification step is, for example, a step of reacting an active terminal of the copolymer obtained in the polymerization step with a compound having a functional group which interacts with silica and/or carbon black. The modification step can introduce a functional group which interacts with silica and/or carbon black, into a polymerization end terminal of the copolymer, to thereby obtain a copolymer with a modified polymerization end terminal. The terminal in the present embodiment means any portion other than a structure derived from a monomer having a carbon-carbon double bond, which is present at a terminal of a molecular chain.

In the modification step, an active terminal of the copolymer obtained in the polymerization step is reacted with a compound having a functional group that interacts with silica and/or carbon black. A polymerization initiator having the functional group that interacts with silica and/or carbon black, in its molecule, can be used to perform polymerization, to thereby introduce the functional group into an initiation terminal of the copolymer. The functional group can also be, if necessary, introduced into each of both initiation and end terminals.

The copolymer for use in the modification reaction (hereinafter, also referred to as "terminal modification reaction") may be one whose polymerization initiation terminal is not modified or is modified, as long as such one has an active terminal. The compound having the functional group is not particularly limited as long as it is a compound having a functional group that interacts with silica and/or carbon black and capable of reacting with a polymerization active terminal of the copolymer, and the modification reaction using such copolymer and compound is preferably a method which involves introduction by use of a tin atom- or nitrogen atom-containing terminal modifying agent, more preferably a method which involves introduction by use of a nitrogen atom-containing terminal modifying agent.

The nitrogen atom-containing terminal modifying agent is preferably, for example, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound, or cyclic urea compound from the viewpoints of polymerization productivity and a high percentage of modification. In particular, a nitrogen group-containing alkoxysilane compound or a cyclic urea compound is more preferable from the viewpoints of polymerization productivity, a high percentage of modification, and reinforcing properties with a filler.

The nitrogen group-containing alkoxysilane compound is not particularly limited, and examples thereof include 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy,2-methyl-1-(3-trimethoxysilylpropyl)-1-aza-2-silacyclopentane, 2-ethoxy,2-ethyl-1-(3-triethoxysilylpropyl)-1-aza-2-silacyclopentane, 2-methoxy,2-methyl-1-(3-dimethoxymethylsilylpropyl)-1-aza-2-silacyclopentane, 2-ethoxy,2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris (trimethoxysilylmethyl)amine, tris(2-trimethoxysilylethyl) amine, tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and N1-(3-(bis(3-(trimethoxysilyl)propyl)amino)propyl)-N1-methyl-N3-(3-(methyl(3-(trimethoxysilyl)propyl)amino)propyl)-N3-(3-(trimethoxysilyl)propyl)-1,3-propanediamine.

The cyclic urea compound is not particularly limited, and examples thereof include 1,3-diethyl-2-imidazolinone, 1,3-dimethyl-2-imidazolinone, 1,3-dipropyl-2-imidazolinone, 1-methyl-3-ethyl-2-imidazolinone, 1-methyl-3-propyl-2-imidazolinone, 1-methyl-3-butyl-2-imidazolinone, 1,3-dihydro-1,3-dimethyl-2H-imidazol-2-one, 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl-2-imidazolidinone, and 1-methyl-3-butyl-2-imidazolidinone.

(Rubber Composition)

The retreaded tire in the present embodiment is produced with a base tire including a sidewall section containing 20 parts by mass or more of the rubbery polymer per 100 parts by mass of the rubber component. The sidewall section of the retreaded tire in the present embodiment can be produced with, for example, a rubber composition including the rubbery polymer as the rubber component and further, if necessary, a filling agent component, a plasticizer component, a crosslinking agent component and/or the like.

The content of the rubbery polymer in the rubber composition is 20 parts by mass or more, more preferably 30 parts by mass or more per 100 parts by mass of the rubber component in the rubber composition, from the viewpoints of an increase in weather resistance of the sidewall section and an increase in number of times of retreading. The "rubber component" conceptually encompasses not only the rubbery polymer in the present embodiment, but also a general-purpose rubber material described below, and the phrase "100 parts by mass of the rubber component" means a case where the total amount of the rubbery polymer and such a general-purpose rubber component is 100 parts by mass.

The rubber composition may include not only the above rubbery polymer, but also, if necessary, a polymer generally used in a common rubber composition for tires. Such a polymer is not particularly limited, and examples thereof include general-purpose rubber materials such as natural rubber (NR), isoprene rubber (IR), styrene-butadiene rubber (SBR) (hereinafter, sometimes referred to as "non-hydrogenated styrene-butadiene rubber") other than the rubbery polymer in the present embodiment, and butadiene rubber (BR) (hereinafter, sometimes referred to as "non-hydrogenated butadiene rubber") other than the rubbery polymer in the present embodiment. These may be used singly or in combinations of two or more kinds thereof.

The compositional ratio of the above general-purpose polymer as the rubber component in the rubber composition constituting the sidewall section can be appropriately set depending on desired performance of the sidewall section.

For example, in one preferred aspect, the composition in the rubber composition is set so that the sidewall section preferably includes 20 parts by mass or more, more preferably 20 parts by mass or more and 80 parts by mass or less, further preferably 30 parts by mass or more and 70 parts by mass or less of natural rubber per 100 parts by mass of the rubber component, from the viewpoint of an increase in tensile strength of the sidewall section.

For example, in one preferred aspect, the composition in the rubber component is set so that the sidewall section includes 20 parts by mass or more, more preferably 20 parts by mass or more and 80 parts by mass or less, further preferably 30 parts by mass or more and 70 parts by mass or less of the above non-hydrogenated butadiene rubber per 100 parts by mass of the rubber component, from the viewpoints of improvements in bending resistance and low generation of heat of the sidewall section.

The non-hydrogenated butadiene rubber and natural rubber may also be used in combination with the rubbery polymer in order that all of bending resistance, low generation of heat, and fracture strength are satisfied. However, the rubber composition, which contains natural rubber and/or the non-hydrogenated butadiene rubber, is preferable in terms of tensile strength and low fuel economy, whereas tends to be inferior in weather resistance and heating resistance because such rubber contains many double bonds.

On the other hand, the rubbery polymer has a few double bonds in its structure, and thus is excellent in weather resistance and heating resistance. As described above, the rubbery polymer is then preferably contained in an amount of 20 parts by mass or more, more preferably 30 parts by mass or more in 100 parts by mass of the rubber component because various physical properties including weather resistance are practically sufficient values in sidewall application of tires. In other words, the percentage of a rubbery polymer having an ethylene moiety is preferably set to a high value from the viewpoints of increases in weather resistance and heating resistance. In a case where natural rubber and the non-hydrogenated butadiene rubber are used in combination from the viewpoint of cost or the like, a rubbery polymer having an ethylene moiety is preferably finely dispersed in the rubber composition. For example, the sidewall section in the present embodiment can be produced so as to contain 30 parts by mass or more of the rubbery polymer, 30 parts by mass or more of natural rubber, and 30 parts by mass or more of the non-hydrogenated butadiene rubber per 100 parts by mass of the rubber component.

A tire having such a sidewall section excellent in weather resistance and heating resistance can be suppressed in degradation of the sidewall section due to heating in a tread re-formation step in a method for producing a retreaded tire, described below. In a retreaded tire production process, determination of whether retreading is possible, in the inspection step, is made depending on the state of degradation of the sidewall section, and thus suppression in degradation of the sidewall section leads to an increase in number of times of repeated use as a retreaded tire.

Degradation of the sidewall section, serving as an index of the limit of the number of times of retreading, can be affected by both (1) age-related degradation of a tire due to heat and/or ultraviolet light applied in use of the tire and (2) degradation due to a heating reaction in retreading. A sidewall section containing a rubbery polymer having a conjugated diene moiety and an ethylene moiety has fewer double bonds in a rubber component than a common sidewall section including natural rubber and/or butadiene rubber and thus (1) is less affected by damage due to ultraviolet light or the like in use of a tire and (2) has few moieties to be subject to attack by radial in heating in retreading, and therefore even a reaction causing cleavage of a polymer chain by a side reaction tends to be suppressed. It is considered that these are combined to lead to the effect of increasing the number of times of retreading.

Fewer double bonds in the rubber component constituting the sidewall section are mainly responsible for enhancements in weather resistance and heat resistance of the sidewall section, as described above, and a reduction in number of double bonds contained in the rubber component of the sidewall section, by compounding a rubbery polymer high in percentage of an ethylene moiety and reducing the amounts of compounding of natural rubber and the non-hydrogenated butadiene rubber, tends to lead to an increase in number of times of retreading, whereas it cannot be said that only such quantities have an effect on such an increase. It is expected that a rubbery polymer having an ethylene moiety, having high tensile strength, is dispersed in the entire composition to result in a tendency to hardly cause the entire composition to be affected by degradation.

The content of the filling agent component is preferably 20 to 50 mass % based on the total amount of the rubber composition. The content of the plasticizer component is preferably 10 to 40 mass % based on the total amount of the rubber composition.

The content of the filling agent is preferably 30 parts by mass or more, more preferably 40 parts by mass or more per 100 parts by mass of the rubber component, from the viewpoint of low fuel economy. The content of the filling agent is preferably 120 parts by mass or less, more preferably 100 parts by mass or less under the assumption that the entire rubber composition is 100 parts by mass, from the viewpoint of Mooney viscosity.

The filling agent component is compounded in the rubber composition for the purpose of reinforcing rubber, and examples thereof include white filling agents (inorganic filling agents) such as silica, calcium carbonate, mica, aluminum hydroxide, magnesium oxide, magnesium hydroxide, clay, talc, alumina, and titanium oxide, and carbon black. These may be used singly or in combinations of two or more kinds thereof. In particular, silica and carbon black are preferable, and combination use thereof is more preferable. For example, in a case where the sidewall section includes silica, the sidewall section preferably includes 30 parts by mass or more, more preferably 30 to 120 parts by mass, further preferably 40 to 100 parts by mass of silica per 100 parts by mass of the rubber component.

The carbon black is not particularly limited, and examples thereof can include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These can be used singly or in combinations of two or more kinds thereof.

The nitrogen adsorption specific surface area (N2SA) of the carbon black is usually 5 to 200 $m^2/g$, is preferably 50 $m^2/g$ or more, more preferably 80 $m^2/g$ or more from the viewpoint of wear resistance, and is preferably 150 $m^2/g$ or less, more preferably 120 $m^2/g$ or less from the viewpoint of low fuel economy. The nitrogen adsorption specific surface area is measured according to ASTM D4820-93.

The amount of absorption of dibutyl phthalate (DBP) by the carbon black is usually 5 to 300 ml/100 g, and preferably the lower limit thereof is 80 ml/100 g and the upper limit thereof is 180 ml/100 g. The amount of absorption of DBP is measured according to ASTM D2414-93.

The silica is not particularly limited, examples thereof include silica by a dry method (anhydrous silica) and silica by a wet method (water-containing silica), and silica by a wet method is preferable because of having many silanol groups.

The nitrogen adsorption specific surface area (N2SA) of the silica is preferably 60 $m^2/g$ or more, more preferably 120 $m^2/g$ or more from the viewpoint of wear resistance, and is preferably 300 $m^2/g$ or less, more preferably 200 $m^2/g$ or less from the viewpoint of low fuel economy. The nitrogen adsorption specific surface area of the silica is a value obtained by measurement with a BET method according to ASTM D3037-81.

The silica is preferably used in combination with a silane coupling agent. The silane coupling agent here used can be any conventionally known one, and examples thereof include sulfide-based silane coupling agents such as bis(3-triethoxysilylpropyl)tetrasulfide, bis(2-triethoxysilylethyl)

tetrasulfide, bis(3-trimethoxysilylpropyl)tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto-based compounds such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino-based silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-based silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents such as 3-nitropropyltrimethoxysilane and 3-nitropropyltriethoxysilane; and chloro-based silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used singly or in combinations of two or more kinds thereof. In particular, a sulfide-based silane coupling agent is preferable, and bis(3-triethoxysilylpropyl)tetrasulfide and bis(3-triethoxysilylpropyl)disulfide are more preferable, from the viewpoints of the coupling effect by the silane coupling agent, processability, and cost.

The content of the silane coupling agent is preferably 3 parts by mass or more, more preferably 5 parts by mass or more based on 100 parts by mass of the silica, from the viewpoints of low fuel economy and wear resistance. The content of the silane coupling agent is preferably 15 parts by mass or less, more preferably 10 parts by mass or less based on 100 parts by mass of the silica, from the viewpoint of Mooney viscosity.

The plasticizer component is not particularly limited, and examples thereof include an extender oil, a resin other than the above polymers, an antioxidant, wax, stearic acid, and a vulcanization accelerator. These may be used singly or in combinations of two or more kinds thereof.

The extender oil is not particularly limited, and examples thereof can include an aromatic mineral oil (viscosity gravity constant (V.G.C. value) 0.900 to 1.049), a naphthene-based mineral oil (V.G.C. value 0.850 to 0.899), and a paraffin-based mineral oil (V.G.C. value 0.790 to 0.849).

The aromatic polycyclic content in the extender oil is preferably less than 3 mass %, more preferably less than 1 mass %. The aromatic polycyclic content is measured according to the Institute of Petroleum (IP, U.K.) 346/92 method. The content (CA) of the aromatic compound in the extender oil is preferably 20 mass % or more. These extender oils may be used in combinations of two or more kinds thereof.

The content of the extender oil is preferably 5 parts by mass or more, more preferably 10 parts by mass or more based on 100 parts by mass of the rubber component, from the viewpoint of Mooney viscosity. The content of the extender oil is preferably 50 parts by mass or less, more preferably 40 parts by mass or less based on 100 parts by mass of the rubber component, from the viewpoint of low fuel economy.

The antioxidant is not particularly limited, and examples thereof include naphthylamine-based antioxidants such as phenyl-α-naphthylamine; diphenylamine-based antioxidants such as octylated diphenylamine and 4,4'-bis(α,α'-dimethylbenzyl)diphenylamine; p-phenylenediamine-based antioxidants such as N-phenyl-N'-isopropyl-p-phenylenediamine, N-(1,3-dimethylbutyl)-N'-phenyl-p-phenylenediamine, and N,N'-di-2-naphthyl-p-phenylenediamine; quinoline-based antioxidants such as a polymerized product of 2,2,4-trimethyl-1,2-dihydroquinoline; monophenol-based antioxidants such as 2,6-di-t-butyl-4-methylphenol and styrenated phenol; and bis, tris, and polyphenol-based antioxidants such as tetrakis-[methylene-3-(3',5'-di-t-butyl-4'-hydroxyphenyl)propoinate]methane. These may be used singly or in combinations of two or more kinds thereof. In particular, a p-phenylenediamine-based antioxidant is preferable, and N-phenyl-N'-isopropyl-p-phenylenediamine is more preferable.

The content of the antioxidant is preferably 0.1 to 5 parts by mass, more preferably 0.2 to 4 parts by mass based on 100 parts by mass of the rubber component.

The wax is not particularly limited, and examples thereof include petroleum waxes such as paraffin wax and microcrystalline wax; natural waxes such as vegetable wax and animal wax; and synthetic waxes such as a polymerized product of ethylene, propylene, or the like. These may be used singly or in combinations of two or more kinds thereof. In particular, petroleum wax is preferable and paraffin wax is more preferable.

The content of the wax is preferably 0.1 to 5 parts by mass, more preferably 0.2 to 4 parts by mass based on 100 parts by mass of the rubber component.

The stearic acid here used can be conventionally known one, and, for example, any product of NOF Corporation, Kao Corporation, FUJIFILM Wako Pure Chemical Corporation, and Chiba Fatty Acid Co., Ltd. can be used. These may be used singly or in combinations of two or more kinds thereof.

The content of the stearic acid is preferably 0.1 to 5 parts by mass, more preferably 0.2 to 4 parts by mass based on 100 parts by mass of the rubber component.

The vulcanization accelerator is not particularly limited, and examples thereof can include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethyl thiuram monosulfide and tetramethyl thiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, and N,N'-diisopropyl-2-benzothiazole sulfenamide; and guanidine-based vulcanization accelerators such as diphenylguanidine, diorthotolylguanidine, and orthotolylbiguanidine. These may be used singly or in combinations of two or more kinds thereof. In particular, a sulfenamide-based vulcanization accelerator is preferable and N-cyclohexyl-2-benzothiazole sulfonamide is more preferable because the effects of the present embodiment are more suitably obtained. A guanidine-based vulcanization accelerator is preferably used in combination.

The content of the vulcanization accelerator is preferably 0.1 to 5 parts by mass, more preferably 0.2 to 4 parts by mass based on 100 parts by mass of the rubber component.

Not only the above components, but also any compounding agent(s) conventionally used in the rubber industry, for example, a vulcanizing agent such as sulfur; a vulcanization activator such as zinc oxide; organic peroxide; a processing aid such as a lubricant; and/or an antioxidant can be used in the rubber composition.

The vulcanizing agent is not particularly limited, and sulfur can be suitably used. The content of such sulfur is preferably 0.5 to 5 parts by mass, more preferably 1 to 3 parts by mass based on 100 parts by mass of the rubber component. Thus, the effects of the present embodiment are more suitably obtained.

The rubber composition is produced by a common method. That is, it can be produced by, for example, a method involving kneading each of the components by a Banbury mixer, a kneader, an open roll, or the like and then performing vulcanization.

(Configuration of Retreaded Tire)

A retreaded tire produced by the present embodiment as described above includes, for example, a tread section, a crown section, a sidewall section constituting a tire side surface, and a bead section abutting with a rim wheel. A retreaded tire in an embodiment of the present invention has, for example, a bead core and a carcass layer. An inner liner as a rubber layer corresponding to a tube and having high airtightness is provided inside the carcass layer in a radial direction of the tire.

The structure and use of a base tire to be retreaded are not particularly limited, and the aspect ratio of the retreaded tire of the present embodiment is preferably 45 or more because the area of the sidewall section is large and the effect of enhancing weather resistance and heat resistance in the present embodiment is more exerted.

While retreading has been conventionally often used for truck/bus tires, the method for producing a retreaded tire of the present embodiment can be, of course, used for truck/bus tires. In this regard, it is effective to also utilize retreading for passenger car tires, from the viewpoints of effective utilization of resources and sustainable development goals, and it is considered that a need therefor is increased from now. Therefore, the method for producing a retreaded tire of the present embodiment can also be used for passenger car tires. Thus, the method for producing a retreaded tire, in which a base tire with a sidewall section high in weather resistance and heating resistance is used to increase the number of times of possible retreading, can be said to contribute to effective utilization of resources.

<Each Step in Method for Producing Retreaded Tire>

The method for producing a retreaded tire of the present embodiment can include the inspection step, the base tire production step, and the retreading step, as described above. Herein, the production method of the present embodiment may include other step, without any limitation to these steps. Examples of such other step include a final inspection step to be carried out after the retreading step.

(Inspection Step)

The inspection step is a step of inspecting whether a used tire recovered can be retreaded. The inspection step preferably includes not only inspecting whether the base tire can be retreaded, but also a step of identifying whether the base tire includes a sidewall section containing 20 parts by mass or more of a rubbery polymer having a conjugated diene compound-based constituent unit and an ethylene-based constituent unit per 100 parts by mass of the rubber component (hereinafter, sometimes referred to as "identification step"). The identification step may be carried out before or after the inspection step, or at the same time as the inspection step.

—Method for Identifying Rubbery Polymer in Sidewall Section in Base Tire—

The method for producing a retreaded tire of the present embodiment is a method for retreading the base tire containing a specified rubbery polymer in the sidewall section, as described above, and thus the composition of the base tire is preferably confirmed before the method is carried out. Examples of the method for identifying the presence/absence of inclusion of the rubbery polymer in the present embodiment, in the sidewall section of the base tire, include a method including recognizing a production lot with reference to a stamp on the sidewall section of the base tire, and investigating, with the production lot, whether the rubbery polymer having a conjugated diene compound-based constituent unit and an ethylene-based constituent unit is used in the production step, and the amount of the rubbery polymer compounded. For example, the content of the rubbery polymer in the present embodiment, in the rubber component in the sidewall of the retreaded tire, can also be quantitatively determined by use of 13C-13C two-dimensional NMR as solution NMR as described in JSR TECHNICAL REVIEW No. 126/2019 (13C NMR analysis of diene-based blended vulcanized rubber).

(Base Tire Production Step)

The base tire production step is a step of scraping off a tread section from the used tire and producing a base tire. The method for scraping off a tread section from the used tire is not particularly limited, and a known method can be appropriately adopted.

(Retreading Step)

The retreading step is a step of re-forming a tread on the base tire. As described above, the step of re-forming a tread can be made with a known method, for example, a system (pre-cure system) in which a tread is formed by fixation and formation of a tread pattern vulcanized in advance and adhesion by co-vulcanization in a vulcanization can with cushion rubber being interposed, or a system (re-molding system) in which unvulcanized tread rubber is mounted on the base tire and vulcanized in a mold.

The temperature in adhesion by co-vulcanization in the pre-cure system is not particularly limited, and is preferably 80 to 140° C., further preferably 85 to 135° C., particularly preferably 90 to 130° C. from the viewpoint of securement of adhesiveness between the base tire and the vulcanized tread pattern.

The temperature in vulcanization in the re-molding system is not particularly limited, and is preferably 125 to 175° C., further preferably 130 to 170° C., particularly preferably 135 to 165° C. from the viewpoint of certain vulcanization of unvulcanized tread rubber.

A retreaded tire obtained by the present embodiment is suitably used in, for example, a truck/bus tire, a passenger car tire, a motorcycle tire, and a competition tire, and particularly suitably used in a truck/bus tire and a passenger car tire.

EXAMPLES

Hereinafter, the present embodiment is described in more detail with reference to specific Examples and Comparative Examples, but the present embodiment is not limited to the following Examples and Comparative Examples at all.

Various physical properties in Examples and Comparative Examples were measured by the following methods.

(Microstructure of Butadiene Portion in Rubbery Polymer Before Hydrogenation (Amount of 1,2-Vinyl Bond))

A measurement sample was obtained by dissolving 50 mg of a rubbery polymer before hydrogenation, as a specimen, in 10 mL of carbon disulfide.

An infrared spectrum was measured in the range from 600 to 1000 $cm^{-1}$ by use of a solution cell, and the amount (mol %) of a microstructure of a butadiene portion, namely, 1,2-vinyl bond, was determined from the absorbance at a predetermined wavenumber by the calculation expression according to the Hampton's method (method described in R. R. Hampton, Analytical Chemistry 21, 923 (1949)) (measurement apparatus: Fourier transform infrared spectrophotometer "FT-IR230" manufactured by JASCO Corporation).

(Percentage of Modification of Rubber Polymer)

Measurement was performed by a column adsorption GPC method, as follows. The property of a rubbery polymer modified by a nitrogen atom-containing functional group, which was to adsorb to a column, was utilized to measure the percentage of modification of the rubbery polymer.

The percentage of modification was determined by measuring the amount of adsorption of the rubbery polymer to a silica-based column, from the difference between respective chromatograms obtained by subjecting a specimen solution including a specimen and low-molecular weight internal standard polystyrene, to measurement with a polystyrene-based column and with the silica-based column.

Specifically, the measurement was performed as shown below.

—Preparation of Specimen Solution—

A specimen solution was obtained by dissolving 10 mg of a specimen and 5 mg of standard polystyrene in 20 mL of THF.

Measurement was performed by using THE containing 5 mmol/L of triethylamine, as an eluent, and injecting 20 μL of the specimen solution into an apparatus. The columns used were a guard column: trade name "TSKguardcolumn SuperH-H" manufactured by Tosoh Corporation, and columns: trade name "TSKgel SuperH5000", "TSKgel SuperH6000", and "TSKgel SuperH7000" manufactured by Tosoh Corporation. A chromatogram was obtained by measurement with an RI detector (HLC8320 manufactured by Tosoh Corporation) under conditions of a column oven temperature of 40° C. and a flow rate of THE of 0.6 mL/min.

—GPC Measurement Conditions with Silica-Based Column—

Trade name "HLC-8320GPC" manufactured by Tosoh Corporation and THE as an eluent were used, 50 μL of the specimen solution was injected into an apparatus, and a chromatogram was obtained with an RI detector in conditions of a column oven temperature of 40° C. and a flow rate of THE of 0.5 ml/min. The columns here used were trade names "ZORBAX PSM-1000S", "PSM-300S", and "PSM-60S" connected, and trade name "DIOL 4.6×12.5 mm 5 micron" connected as a guard column to the preceding stage.

—Method for Calculating Percentage of Modification—

The percentage of modification (%) was determined according to the following expression wherein the peak area of the specimen was designated as "P1" and the peak area of standard polystyrene was designated as "P2" when the entire peak area of the chromatogram with the polystyrene-based column was defined as 100, and the peak area of the specimen was designated as "P3" and the peak area of standard polystyrene was designated as "P4" when the entire peak area of the chromatogram with the silica-based column was defined as 100:

$$\text{Percentage of modification } (\%)=[1-(P2\times P3)/(P1\times P4)]\times 100$$

provided that P1+P2=P3+P4=100 was satisfied.

(Percentage of Hydrogenation of Rubbery Polymer)

A large amount of methanol was added to a reaction liquid of the rubbery polymer after a hydrogenation reaction, to thereby precipitate and recover a hydrogenated conjugated diene-based polymer.

Next, the hydrogenated conjugated diene-based polymer was extracted with acetone, and the hydrogenated conjugated diene-based polymer was dried in vacuum.

The resultant was used as a sample for 1H-NMR measurement, and the percentage of hydrogenation of the rubbery polymer was measured.

Conditions of 1H-NMR measurement were noted below.

—Measurement Conditions—

Measurement instrument: JNM-LA400 (manufactured by JEOL Ltd.)
Solvent: deuterated chloroform
Measurement sample: each product extracted before and after hydrogenation of polymer
Concentration of sample: 50 mg/mL
Frequency in observation: 400 MHz
Chemical shift standard: TMS (tetramethylsilane)
Pulse delay: 2.904 seconds
Number of scannings: 64
Pulse width: 45°
Measurement temperature: 26° C.

(Amount (Mass %) of Styrene in Rubbery Polymer)

A measurement sample was obtained by filling 100 mg of the specimen in chloroform so that the volume was 100 mL and thus dissolving the specimen. The amount (mass %) of styrene in the specimen was determined from the amount of absorption at a wavelength (around 254 nm) of ultraviolet light absorbed by a phenyl group of styrene (measurement apparatus: spectrophotometer "UV-2450" manufactured by Shimadzu Corporation).

«Production of Rubbery Polymer»

<Preparation of Hydrogenation Catalyst>

A hydrogenation catalyst to be used in preparation of a rubbery polymer in Production Example described below was prepared by a method of the following Production Example α.

Production Example α

A reaction container purged with nitrogen was charged with 1 liter of cyclohexane dried and purified, 100 millimole of bis(η5-cyclopentadienyl)titanium chloride was added thereto, and a n-hexane solution including 200 millimole of trimethylaluminum was added thereto with sufficient stirring, to perform a reaction at room temperature for about 3 days, thereby obtaining a hydrogenation catalyst (TC-1).

<Production of Rubbery Polymer by Polymerization>

(Production Example 1) Rubbery Polymer A

A temperature-controllable autoclave having an inner volume of 43 L, equipped with a stirrer and a jacket, was used as a reactor, 3,309 g of 1,3-butadiene from which impurities were removed in advance, 25,800 g of cyclohexane, and 15.5 g of 2,2-di(2-tetrahydrofuryl)propane as a polar substance were placed in the reactor, and the inner temperature of the reactor was retained at 42° C.

Subsequently, 3.7 g of n-butyllithium was fed as a polymerization initiator to the reactor.

After initiation of a polymerization reaction, the temperature in the reactor was started to be raised due to heat generated by the polymerization, and 992.6 g of additional 1,3-butadiene was added after no temperature rise was confirmed.

After termination of a temperature rise in the reactor due to reaction heat of the additional butadiene, 1.9 g of methanol was added into the reactor, and stirred for 5 minutes. A polymerization solution was partially extracted, and subjected to drying, to thereby obtain a rubbery polymer before hydrogenation.

Thereafter, the hydrogenation catalyst (TC-1) prepared in (Production Example $\alpha$) described above was added at 60 ppm on a Ti basis, per 100 parts by mass of the rubbery polymer before hydrogenation, to a solution of the rubbery polymer before hydrogenation, and a hydrogenation reaction was made at a hydrogen pressure of 0.8 MPa and an average temperature of 85° C. for 50 minutes so that the percentage of hydrogenation in Table 1 was achieved, to thereby obtain rubbery polymer A.

To a solution of the rubbery polymer obtained were added 12.6 g of n-octadecyl-3-(3,5-di-t-butyl-4-hydrooxyphenyl)-propionate as an oxidation inhibitor and 3.0 g of 4,6-bis(octylthiomethyl)-o-cresol.

The analysis values of rubbery polymer A are shown in Table 1.

(Production Example 2) Rubbery Polymer B

Rubbery polymer B was obtained under the same production conditions as in Production Example 1 except that the amounts of 1,3-butadiene, styrene and additional 1,3-butadiene as monomers placed into the reactor in advance were respectively 3,046 g, 344.0 g and 913.8 g.

The analysis values of rubbery polymer B are shown in Table 1.

(Production Example 3) Rubbery Polymer C

Rubbery polymer C was obtained under the same production conditions as in Production Example 1 except that the amounts of 1,3-butadiene, styrene and additional 1,3-butadiene as monomers placed into the reactor in advance were respectively 2,911 g, 516.0 g and 873.2 g.

The analysis values of rubbery polymer C are shown in Table 1.

(Production Example 4) Rubbery Polymer D

Rubbery polymer D was obtained under the same production conditions as in Production Example 2 except that 3.8 g of 2,2-dimethoxy-1-(3-(trimethoxysilyl)propyl)-1,2-azasilolidine (hereinafter, sometimes referred to as "AS-1") as a modifying agent was added instead of methanol into the reactor.

The analysis values of rubbery polymer D are shown in Table 1.

(Production Examples 5 and 6) Rubbery Polymers E and F

Rubbery polymers E and F were each obtained under the same production conditions as in Production Example 4 except that the amount of hydrogen added was changed so that the percentage of hydrogenation in Table 1 was achieved.

The analysis values of rubbery polymers E and F are shown in Table 1.

(Production Example 7) Rubbery Polymer G

Rubbery polymer G was obtained under the same production conditions as in Production Example 1 except that no hydrogenation reaction was made.

The analysis values of rubbery polymer G are shown in Table 1.

(Production Example 8) Rubbery Polymer H

Rubbery polymer H was obtained under the same production conditions as in Production Example 4 except that no hydrogenation reaction was made.

The analysis values of rubbery polymer H are shown in Table 1.

TABLE 1

| | | Unit | Production Example 1 | Production Example 2 | Production Example 3 | Production Example 4 | Production Example 5 | Production Example 6 | Production Example 7 | Production Example 8 |
|---|---|---|---|---|---|---|---|---|---|---|
| Specimen name (rubbery polymer) | | — | A | B | C | D | E | F | G | H |
| Rubbery polymer structure (before hydrogenation) | Amount of styrene | mass % | 0 | 8 | 12 | 8 | 8 | 8 | 0 | 8 |
| | Amount of vinyl bond | mol % in Bd | 35 | 40 | 25 | 40 | 40 | 40 | 35 | 40 |
| | Terminal modification | — | None | None | None | AS-1 | AS-1 | AS-1 | None | AS-1 |
| Rubbery polymer structure (after hydrogenation) | Percentage of hydrogenation | % | 75 | 75 | 75 | 75 | 95 | 35 | 0 | 0 |

Examples 1 to 12 and Comparative Examples 1 to 6

(Preparation of Rubber Composition for Crosslinking and Evaluation of Physical Properties Thereof)

Rubbery polymers A to H obtained in Production Examples 1 to 8, shown in Table 1, were each used as one raw material rubber according to compounding shown in Table 2 and Table 3, to thereby obtain respective rubber compositions for crosslinking (compounded products I to Z) each containing raw material rubber.

Compounding conditions are as follows.

(Compounding Conditions)

The amount of each compounding agent added was expressed by "parts by mass (phr)" per 100 parts by mass of the rubber component containing no softener for rubber.

Natural rubber RSS No. 3 (manufacturer: UNIMAC RUBBER CO., LTD. (Thailand), supplier: Marubeni Techno Rubber Corporation; "Natural rubber" in the following table)

Polybutadiene rubber (trade name "UBEPOL 150" manufactured by UBE Corporation; "Butadiene rubber" in the following table)

Silica (trade name "ULTRASIL 7000GR" manufactured by Evonik Degussa Japan, nitrogen adsorption specific surface area 175 $m^2/g$)

Silane coupling agent (trade name "Si75" manufactured by Evonik Degussa Japan, bis(triethoxysilylpropyl)disulfide)

Carbon black (trade name "SEAST SO (FEF)" manufactured by TOKAI CARBON CO., LTD., nitrogen adsorption specific surface area 42 $m^2/g$)

Oil ("Process Oil PF30" (SRAEoil) manufactured by JXTG Energy)

Antioxidant 6C (trade name "NOCRAC 6C" manufactured by OUCHI SHINKO CHEMICAL INDUSTRIAL CO., LTD.)

Stearic acid (trade name "LUNAC S-90V" manufactured by Kao Corporation)

Zinc flower (trade name "ZINC OXIDE" manufactured by SAKAI CHEMICAL INDUSTRY CO., LTD.)

Wax (OZOACE 0355 manufactured by NIPPON SEIRO CO., LTD.)

Powdered sulfur ("SULFAX 200S" manufactured by Tsurumi Chemical Industry Co., Ltd.)

Vulcanization accelerator 1 TBBS (N-tert-butylbenzothiazole-2-sulphenamide) (trade name "SANCELER NS-G" manufactured by SANSHIN CHEMICAL INDUSTRY CO., LTD.)

Vulcanization accelerator 2 DPG (1,3-diphenylguanidine) (trade name "NOCCELER D-P" manufactured by OUCHI SHINKO CHEMICAL INDUSTRIAL CO., LTD.)

The rubber compositions for crosslinking were each vulcanized at 160° C. by vulcanizing press, to thereby obtain a vulcanized rubber composition test piece. The vulcanized rubber composition test piece was subjected to heating aging in a gear oven at 100° C. for 72 hours, and the "percentage of change in tensile elongation" and the "percentage of change in hardness" were evaluated before and after heating aging, according to the following methods. The evaluation results are shown in Table 2 and Table 3.

(Evaluation 1: Percentage of Change in Tensile Elongation)

Each tensile elongation before and after heating aging was measured according to JIS K6251. The percentage of change in tensile elongation, as compared with blank (before heating aging) subjected to measurement in advance, was calculated, and was expressed as an index in a case where the results with respect to compounded product Q and compounded product Z were 100 respectively in compounding in Table 2 and compounding in Table 3. It is indicated that, as the numerical value is higher, the degree of reduction in elongation is higher.

(Evaluation 2: Percentage of Change in Hardness)

Each hardness before and after heating aging was measured according to JIS K6301. The percentage of change in hardness, as compared with the composition (vulcanized rubber composition test piece) after vulcanization of blank (before heating aging), subjected to measurement in advance, was calculated, and expressed as an index in a case where the results with respect to compounded product Q and compounded product Z were 100 respectively in compounding in Table 2 and compounding in Table 3. It is indicated that, as the numerical value is higher, the degree of increase in hardness is higher.

(Production of Retreaded Tire)

Each rubber composition for crosslinking, obtained by kneading according to the tables of compounding as described in Table 2 and Table 3, was applied to a sidewall section, to thereby form a pneumatic tire (size 205/85R16) including the sidewall section, by vulcanization. The pneumatic tire obtained was mounted to a rim of 16.0×5.5, and attached to a commercial vehicle, and a market monitoring test was performed until the running distance reached 50000 km. After the monitoring test, a tread section was scraped off from the used retreaded tire, to thereby produce a base tire, and a tread pattern subjected to vulcanization in advance was allowed to adhere thereto by co-vulcanization at 100° C. with cushion rubber being interposed, to thereby obtain a retreaded tire.

(Evaluation of Number of Times of Utilization of Retreaded Tire; Number of Times of Retreading)

The retreaded tire obtained was again mounted to a rim of 16.0×5.5, and attached to a commercial vehicle, and a market monitoring test was performed until the running distance reached 50000 km. After the monitoring test, whether the tire was usable as a base tire was inspected by "visual inspection" and "non-destructive inspection". One rated as passing was subjected to scraping off of a tread section, to thereby produce a base tire, and a tread pattern subjected to vulcanization in advance was allowed to adhere thereto by co-vulcanization at 100° C. with cushion rubber being interposed, to thereby obtain a retreaded tire. This operation was repeated, and the number of times of retreading until use as a base tire was impossible was evaluated. The evaluation results are shown in Table 2 and Table 3.

TABLE 2

| | | Unit | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Name of compounded product | | — | I | J | K | L | M | N | O | P | Q |
| Compounding | Specimen A | phr | 30 | | | | | | | | |
| | Specimen B | phr | | 30 | | | | | | | |
| | Specimen C | phr | | | 30 | | | | | | |
| | Specimen D | phr | | | | 30 | | | | | |
| | Specimen E | phr | | | | | 30 | | | | |
| | Specimen F | phr | | | | | | 30 | | | |
| | Specimen G | phr | | | | | | | 30 | | |
| | Specimen H | phr | | | | | | | | 30 | |

TABLE 2-continued

| | | Unit | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| | Natural rubber | phr | 40 | 40 | 40 | 40 | 40 | 40 | 40 | 40 | 40 |
| | Butadiene rubber | phr | 30 | 30 | 30 | 30 | 30 | 30 | 30 | 30 | 60 |
| | Carbon black | phr | 50 | 50 | 50 | 50 | 50 | 50 | 50 | 50 | 50 |
| | Oil | phr | 10 | 10 | 10 | 10 | 10 | 10 | 10 | 10 | 10 |
| | Zinc flower | phr | 3 | 3 | 3 | 3 | 3 | 3 | 3 | 3 | 3 |
| | Stearic acid | phr | 2 | 2 | 2 | 2 | 2 | 2 | 2 | 2 | 2 |
| | Antioxidant | phr | 3 | 3 | 3 | 3 | 3 | 3 | 3 | 3 | 3 |
| | Wax | phr | 4 | 4 | 4 | 4 | 4 | 4 | 4 | 4 | 4 |
| | Vulcanization accelerator 1 | phr | 0.8 | 0.8 | 0.8 | 0.8 | 0.8 | 0.8 | 0.8 | 0.8 | 0.8 |
| | Sulfur | phr | 1.5 | 1.5 | 1.5 | 1.5 | 1.5 | 1.5 | 1.5 | 1.5 | 1.5 |
| Percentage of change in tensile elongation | 100° C. × 72 hr | INDEX | 87 | 85 | 77 | 80 | 98 | 90 | 115 | 108 | 100 |
| Percentage of change in hardness | 100° C. × 72 hr | INDEX | 84 | 87 | 75 | 82 | 99 | 90 | 112 | 109 | 100 |
| Number of times of retreading | | times | 4 | 4 | 4 | 4 | 4 | 4 | 3 | 3 | 3 |

TABLE 3

| | | Unit | Example 7 | Example 8 | Example 9 | Example 10 | Example 11 | Example 12 | Comparative Example 4 | Comparative Example 5 | Comparative Example 6 |
|---|---|---|---|---|---|---|---|---|---|---|---|
| Name of compounded product | | — | R | S | T | U | V | W | X | Y | Z |
| | Specimen B | phr | 30 | | 20 | 50 | 50 | 50 | | | |
| | Specimen E | phr | | 30 | | | | | | | |
| | Specimen G | phr | | | | | | | 30 | | |
| | Specimen H | phr | | | | | | | | 30 | |
| | Natural rubber | phr | 40 | 40 | 50 | 20 | 50 | 0 | 40 | 40 | 40 |
| | Butadiene rubber | phr | 30 | 30 | 30 | 30 | 0 | 50 | 30 | 30 | 60 |
| | Carbon black | phr | 5 | 5 | 5 | 5 | 5 | 5 | 5 | 5 | 5 |
| | Silica | phr | 45 | 45 | 45 | 45 | 45 | 45 | 45 | 45 | 45 |
| | Silane coupling agent | phr | 4.5 | 4.5 | 4.5 | 4.5 | 4.5 | 4.5 | 4.5 | 4.5 | 4.5 |
| | Oil | phr | 10 | 10 | 10 | 10 | 10 | 10 | 10 | 10 | 10 |
| | Zinc flower | phr | 3 | 3 | 3 | 3 | 3 | 3 | 3 | 3 | 3 |
| | Stearic acid | phr | 2 | 2 | 2 | 2 | 2 | 2 | 2 | 2 | 2 |
| | Antioxidant | phr | 3 | 3 | 3 | 3 | 3 | 3 | 3 | 3 | 3 |
| | Wax | phr | 4 | 4 | 4 | 4 | 4 | 4 | 4 | 4 | 4 |
| | Vulcanization accelerator 2 | phr | 0.4 | 0.4 | 0.4 | 0.4 | 0.4 | 0.4 | 0.4 | 0.4 | 0.4 |
| | Sulfur | phr | 1.5 | 1.5 | 1.5 | 1.5 | 1.5 | 1.5 | 1.5 | 1.5 | 1.5 |
| Percentage of change in tensile elongation | 100° C. × 72 hr | INDEX | 85 | 97 | 88 | 78 | 77 | 79 | 118 | 111 | 100 |
| Percentage of change in hardness | 100° C. × 72 hr | INDEX | 83 | 98 | 86 | 74 | 78 | 80 | 117 | 111 | 100 |
| Number of times of retreading | | times | 4 | 4 | 4 | 4 | 4 | 4 | 3 | 3 | 3 |

It was confirmed as shown in Table 2 and Table 3 that each of the compounded products in Examples 1 to 12 exhibited low degrees of percentages of changes in elongation and hardness after heating aging as compared with the compounded products in Comparative Examples 1 to 6, and could be suppressed in degradation in the form of a vulcanized rubber product. In other words, the compounded products in these Examples were more stable under a heating condition of 100° C. Furthermore, a retreaded tire obtained by retreading with a base tire containing such a compounded product in a sidewall section had an increased number of times of possible retreading. The number of times of possible retreading was increased because age-related degradation due to heat or ultraviolet light applied in use of a tire and/or degradation due to heat applied in the step of adhesion by co-vulcanization in production of a retreaded tire were/was small.

INDUSTRIAL APPLICABILITY

The rubbery polymer in the present invention can be industrially utilized in the retreaded tire field, and the method for producing a retreaded tire of the present invention, by use of a base tire including a sidewall section containing the rubbery polymer, can also be industrially utilized similarly in the retreaded tire field.

What is claimed is:

1. A method for treating a retreaded tire to increase a number of times of utilization of the retreaded tire, comprising retreading a base tire comprising a sidewall section containing 20 parts by mass or more of a rubbery polymer per 100 parts by mass of a rubber component, wherein the rubbery polymer is hydrogenated butadiene rubber or hydrogenated styrene-butadiene rubber that has an average molecular weight (Mw) of $10\times10^4$ or more and $200\times10^4$ or less, and the rubbery polymer is a random copolymer comprising a conjugated diene compound-based constituent unit containing at least 1,3 butadiene, an aromatic vinyl compound-based constituent unit wherein an aromatic moiety of the aromatic vinyl compound-based constituent unit is present in an amount of 40 mass % or less based on the total mass of the rubbery polymer, and an ethylene-based constituent unit wherein a percentage of a long chain of eight or more continuous ethylene-based constituent units is 10 mass % or less based on the total mass of the rubbery polymer, and the rubbery polymer has a percentage of hydrogenation of 35 to 95 mol %.

2. The method for treating the retreaded tire according to claim 1, wherein the rubbery polymer has a functional group that interacts with silica and/or carbon black.

3. The method for treating the retreaded tire according to claim 1, wherein the sidewall section contains 30 parts by mass or more of silica per 100 parts by mass of the rubber component.

4. The method for treating the retreaded tire according to claim 1, wherein the sidewall section contains 20 parts by mass or more of natural rubber per 100 parts by mass of the rubber component.

5. The method for treating the retreaded tire according to claim 1, wherein the sidewall section contains 20 parts by mass or more of non-hydrogenated butadiene rubber per 100 parts by mass of the rubber component.

6. The method for treating the retreaded tire according to claim 1, wherein the sidewall section contains 30 parts by mass or more of the rubbery polymer, 30 parts by mass or more of natural rubber, and 30 parts by mass or more of non-hydrogenated butadiene rubber per 100 parts by mass of the rubber component.

7. The method for treating the retreaded tire according to claim 1, wherein an aspect ratio of the retreaded tire is 45 or more.

8. The method for treating the retreaded tire according to claim 1, wherein the retreaded tire is a truck or bus tire.

9. The method for treating the retreaded tire according to claim 1, wherein the retreaded tire is a passenger car tire.

* * * * *